United States Patent [19]

Okamoto

[11] Patent Number: 4,985,850
[45] Date of Patent: Jan. 15, 1991

[54] OUTPUT APPARATUS

[75] Inventor: Yoshifumi Okamoto, Yokohama, Japan

[73] Assignee: Canon Kabushiki Kaisha, Tokyo, Japan

[21] Appl. No.: 321,395

[22] Filed: Mar. 10, 1989

[30] Foreign Application Priority Data

Mar. 15, 1988 [JP] Japan .................................. 63-59511

[51] Int. Cl.$^5$ ............................................. G06K 15/00
[52] U.S. Cl. ................................... 364/519; 364/200; 364/900
[58] Field of Search ........... 364/518, 519, 237.82 MS, 364/930 MS, 523; 346/154, 157, 76 PH; 358/300, 296, 78, 80

[56] References Cited

U.S. PATENT DOCUMENTS 4,270,141  5/1981  Sakamoto .............................. 358/78

*Primary Examiner*—Arthur G. Evans
*Attorney, Agent, or Firm*—Fitzpatrick, Cella, Harper & Scinto

[57] ABSTRACT

There is provided an output apparatus comprising: a 1st memory to store the print information of the 1st color; a 2nd memory which stores the print information of the 2nd color and has the same address arrangement as that of the 1st memory; a CPU as a reading device for allowing the print information of the 1st and 2nd colors to be simultaneously read out of the 1st and 2nd memories synchronously with the print timing for the 1st-color print information; and a timing adjusting circuit for delaying the print timing for the readout 2nd-color print information than the print timing for the 1st-color print information by a predetermined time. The 2nd-color print information is temporarily stored into the 2nd memory consisting of an RAM or buffer memory and is read out therefrom after the print of the 1st-color print information. With the apparatus, the number of access reading times is reduced and the access timings for the memories can be easily adjusted by the single operation.

4 Claims, 5 Drawing Sheets

OUTPUT APPARATUS

BACKGROUND OF THE INVENTION

1. Field of the Invention

The present invention relates to an output apparatus in which a memory of print information is provided for every color and the printing can be performed in a plurality of colors.

2. Related Background Art

Hitherto, there has been known a two-color laser beam printer of the type in which document information such as code data or the like which is sent from a host computer or the like is developed as a bit image in an internal memory and, thereafter, the bit information is read out and output as a visible image. Such a conventional printer has memories for storing a bit image to be output for every color. For instance, in the case of printing a two-color bit image (character information or image information) on one line, the bit image of the first color is first read out of the first memory and charged, exposed, and developed for a photo sensitive drum, and the bit image of the second color is then read out of the second memory and charged, exposed, and developed for the photo sensitive drum.

Therefore, the number of accessing times for the memories in the two-color laser printer is a total of four times consisting of two reading operations of the bit images and two writing operations of the bit images.

However, since those bit images are input and output by a common bus which is connected to the memories, the four memory accesses must be time sequentially executed. On the other hand, a conventional multi color printer has the problem that the timing controls for the accesses for the memories become complicated in addition to the fact that the laser exposing timings for the photo sensitive material differ with every color.

Thus, there is also the problem that a deviation of the exposing timings due to the influence of attachment errors of the laser light emitting devices used to expose the photo sensitive material is hard to compensate for by the reading timings for the memories. Further, even in the case of a printer of three colors, four colors, or the like instead of the full-color printer, there is the drawback that the above problems are enhanced.

SUMMARY OF THE INVENTION

It is an object of the present invention to eliminate the foregoing drawbacks in consideration of the above-mentioned points.

Another object of the invention is to provide a printer in which the foregoing problems are solved and the access timings for memories can be easily adjusted.

Still another object of the invention is to provide an output apparatus comprising: first memory means for storing print information of the first color; second memory means which stores print information of the second color and has the same address construction as that of the first memory means; means for simultaneously reading out the print information of the first and second colors from the first and second memory means synchronously with a print timing for the print information of the first color; and timing adjusting means for delaying a print timing for the readout print information of the second color than the print timing for the print information of the first color by a predetermined time.

Still another object of the invention is to provide an output apparatus wherein the first and second print information are simultaneously read out from first and second memory means synchronously with the print timing for the print information of the first color, the print information of the first color is printed, the print information of the second color is printed at the print timing which was delayed by timing adjusting means, it is sufficient for reading means to instruct a reading operation one time since addresses in the first and second memory means are the same, the number of reading times is reduced from that in the conventional apparatus, and further, it is sufficient once to adjust the print timings for the first and second colors by the timing adjusting means, so that the access timings for the memories can be fairly easily adjusted.

Still another object of the invention is to provide an output apparatus which can output a plurality of colors such as three colors, four colors, . . . , ten colors, or the like and has memory means corresponding to each color and can reduce the number of reading times from the memory means.

Still another object of the invention is to provide an output apparatus which can output three or more colors and has a memory area corresponding to each color and can adjust a print timing in accordance with each color after reading.

DETAILED DESCRIPTION OF THE PREFERRED EMBODIMENTS

An embodiment of the present invention will be described in detail hereinbelow with reference to the drawings.

Figure 1:
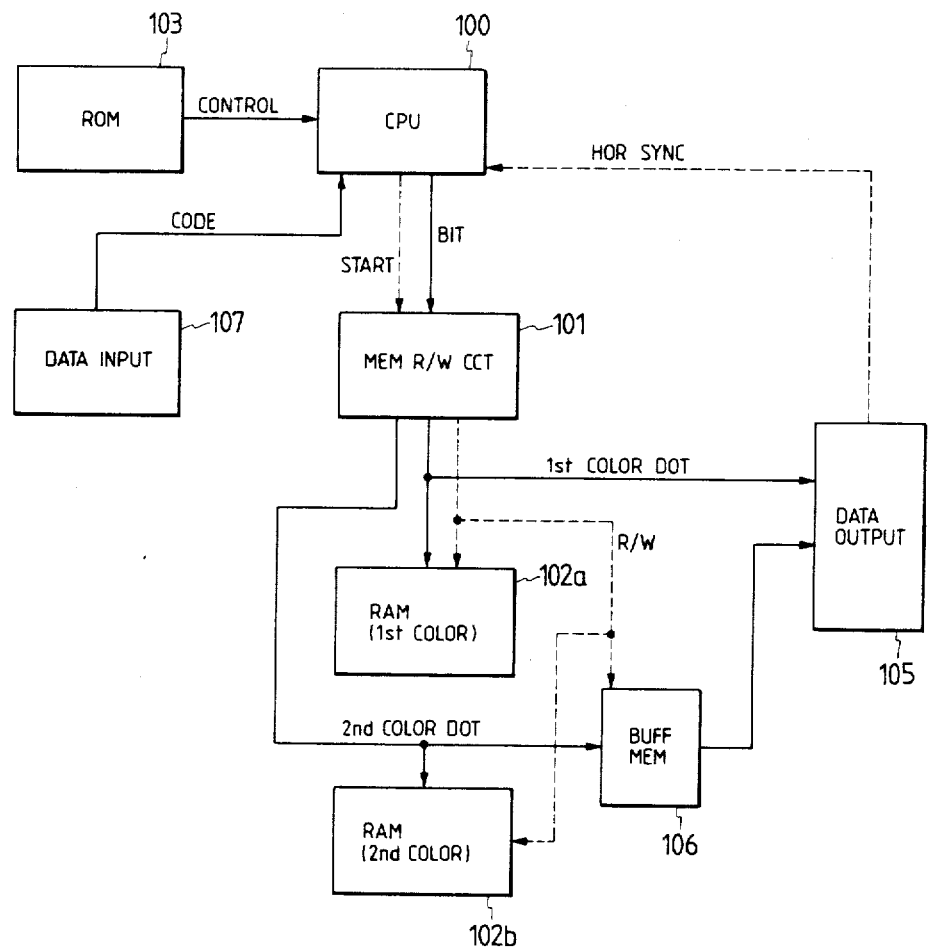
FIG. 1 is a block diagram showing a functional arrangement of an embodiment of the present invention.

FIG. 1 shows a functional arrangement of a laser printer as an example of an output apparatus of an embodiment of the present invention.

In FIG. 1, reference numeral 100 denotes a central processing unit (CPU) to control a whole two-color laser beam printer. The CPU 100 executes a control program stored in a read only memory (ROM) 103.

Reference numeral 102a denotes a random access memory (RAM) to store a bit image of the first color. Bit information is stored in the RAM 102a in correspondence to, for instance, print dot positions of a page unit.

An RAM 102b stores a bit image of the second color. Bit information is also stored in the RAM 102b in correspondence to print dot positions of a page unit in a manner similar to the RAM 102a. In the example, to print by two colors, no dot of the second color is printed at the position where a dot of the first color is printed.

Considering that both of the bit images of the first and second colors exist on the same line, in the conventional apparatus, after the bit image of the first color of one line was read out, the bit image of the second color of the same line is read out. However, in the embodiment, the bit images of two colors are simultaneously read out of the RAMs 102a and 102b. A buffer memory 106 is provided to adjust the print timing for the second color for a data output unit 105 to print. The bit image of the second color which was read out simultaneously with the bit image of the first color is stored into the buffer memory 106.

A memory read/write (R/W) circuit 101 instructs the reading/writing operations for the RAMs 102a and 102b and buffer memory 106 in the foregoing operations.

The operation of the embodiment will now be described.

Character information in a code format which had been transmitted from an external apparatus such as a host computer or the like and was received by a data input unit 107, for instance, an interface is converted into dot information in a bit image format by the CPU 100. Since such a converting procedure is well-known, its detailed description is omitted.

The dot information converted into the bit image is transmitted in parallel through the memory R/W circuit 101 every designated color and every predetermined amount and stored into the RAMs 102a and 102b.

On the other hand, when the print of a certain line by the first color is started, the data output unit 105 generates a horizontal sync signal for the first color. On the basis of the horizontal sync signal, the CPU 100 instructs the memory R/W circuit 101 to become operative.

The CPU 100 also instructs the reading operations for the RAMs 102a and 102b (generates read signals) and designates read addresses.

Upon reception of a read signal from the CPU 100, the memory read/write circuit 101 transfers an R/W signal to the RAMs 102a and 102b, thereby allowing the dot information of the first color to be output from the RAM 102a and allowing the dot information of the second color to be output from the RAM 102b.

The dot information of the first color is transmitted to the data output unit 105 and used to print by the first color.

On the other hand, the dot information of the second color is transferred from the RAM 102b to the buffer memory 106 and is temporarily stored. The memory R/W circuit 101 also instructs the writing operation for the buffer memory 106. The similar procedure is repeated after that. The dot information of the first color of one line to print is transmitted to the data output unit 105. The dot information of the second color is stored into the buffer memory 106.

Next, after the elapse of a predetermined time, at the print timing for the dot information of the second color, the dot information of the second color is sequentially transferred from the buffer memory 106 to the data output unit 105 in response to the instruction by the memory R/W circuit 101.

Upon reception of the horizontal sync signal from the data output unit 105, the CPU 100 merely simultaneously instructs the reading operations for the RAMs 102a and 102b and designates the read addresses. Thus, the number of accessing times for the RAMs 102a and 102b is total three times consisting of two writing operations and one reading operation and the number of accessing times is reduced as compared with four times in the conventional apparatus.

Further, in the embodiment, the dot information of the second color is output from the buffer memory 106. Therefore, the output of the buffer memory 106 can be controlled in accordance with the print timing for the data output unit 105 irrespective of the CPU 100 without obstructing the control instruction of the CPU 100 which controls various kinds of apparatuses in the printer.

Figure 2:
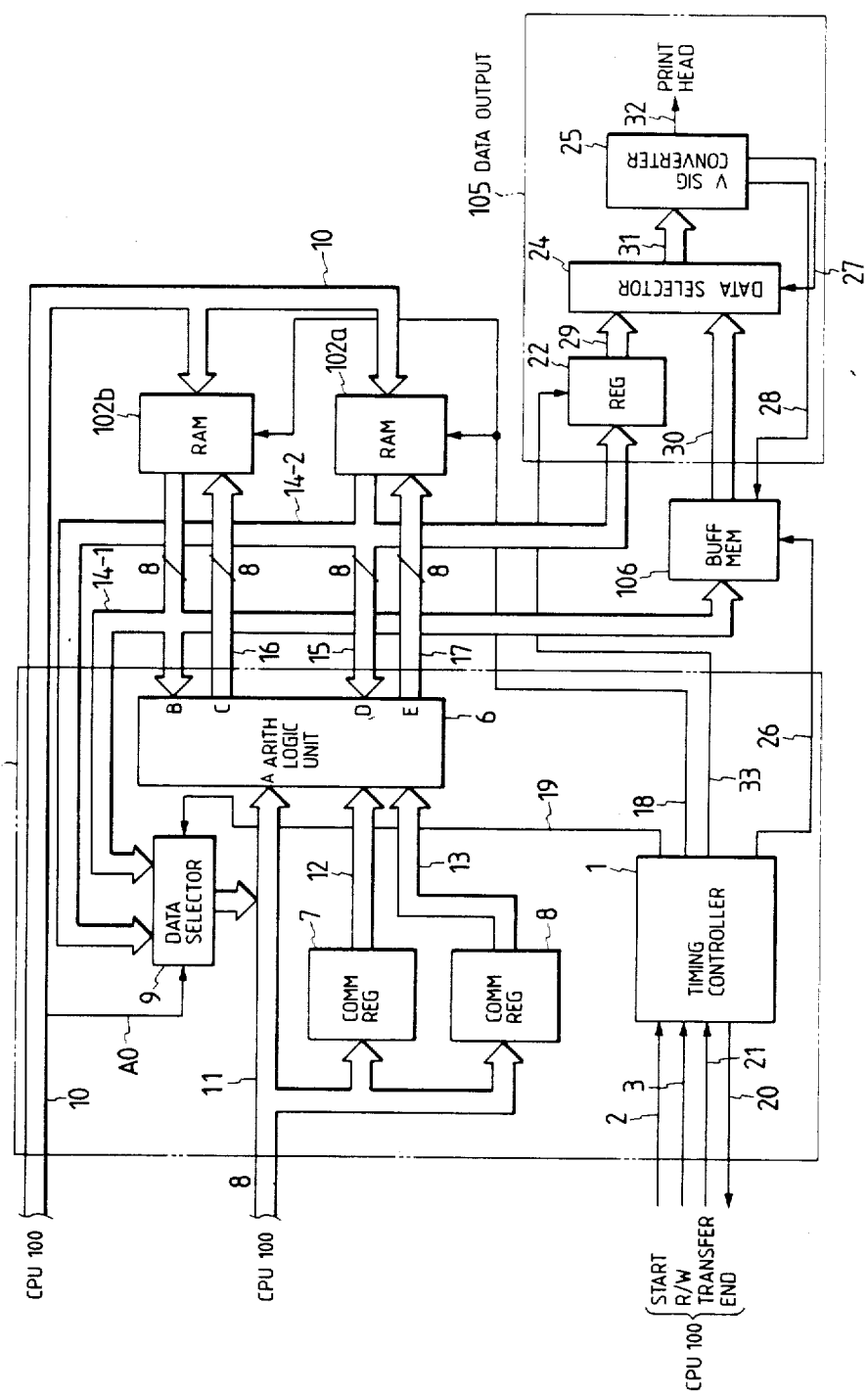
FIG. 2 is a circuit diagram showing a practical construction of the embodiment of the invention.

FIG. 2 shows a detailed circuit arrangement of the memory W/R circuit 101 shown in FIG. 1.

In FIG. 2, reference numeral 1 denotes a timing controller which is made operative by a start signal 2 and a read/write (R/W) signal 3 from the CPU 100. The timing controller 1 controls the timings for the writing/reading operations for the RAMs 102a and 102b.

It is sufficient that the timing controller 1 generates signals, which will be explained hereinlater, at timings shown in FIGS. 3 to 5 and can be constructed by using a flip-flop and the like. To construct the timing generator 1 by a simple construction, an ROM is used, a signal timing for generation is written into the ROM, addresses in the ROM are indicated by a counter, and generation signals are sequentially read out.

Reference numeral 6 denotes an arith logic unit to perform predetermined arithmetic operating processes for the dot information to be stored into the RAMs 102a and 102b. The unit 6 is provided separately from the CPU 100 in order to reduce the load of the CPU 100. The unit 6 does not need to be provided in particular in the case where the arithmetic operating processes for the dot information are executed by the CPU 100.

For the dot information read out of the RAMs 102a and 102b, the arith logic unit 6 executes the arithmetic operating processes to prevent the color mixture which are instructed by command registers 7 and 8 and again stores the results into the RAMs 102a and 102b, respectively. The timing controller 1 also instructs the operations of the RAMs 102a and 102b for the arith logic unit 6.

The RAMs 102a and 102b are connected to the CPU 100 by an address bus. Eleven bits excluding the least significant bit $A_0$ among twelve bits of the address bus 10 are used. The RAMs 102a and 102b have the same addresses. The CPU 100 instructs to switch between the RAMs 102a and 102b on the basis of the value of the least significant bit of the address bus 10.

Figure 6A:
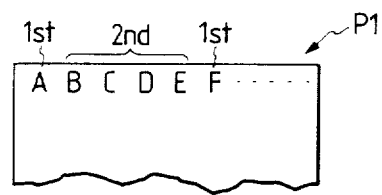
FIGS. 6A to 6C are explanatory diagrams showing the correspondence relations between the print side and the memory contents of RAMs 102a and 102b in the embodiment of the invention.
Figure 6B:
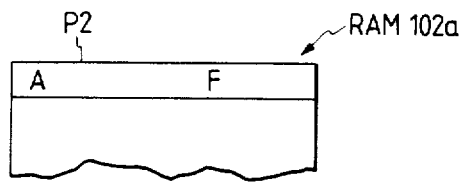
Figure 6C:
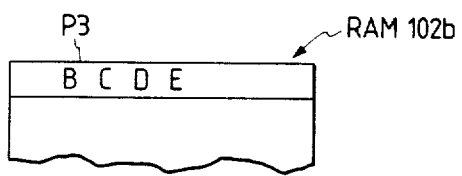
Figure 8A:
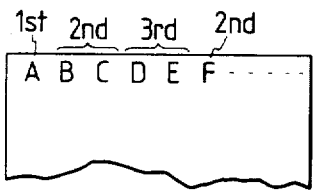
FIGS. 8A to 8D are explanatory diagrams showing the contents of RAMs 102a to 102c and the print information.
Figure 8B:
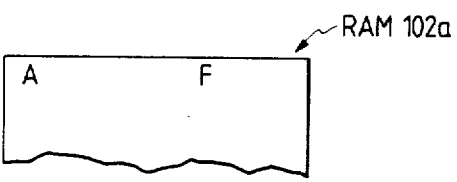
Figure 8C:
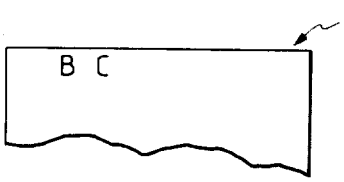
Figure 8D:
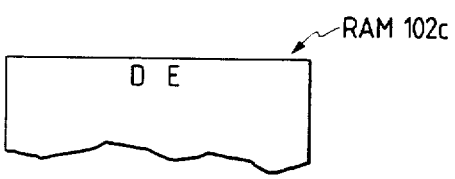

In the case of printing two-color print information "ABCDEF . . . " shown in FIGS. 6A to 6C, the bit image pattern (dot information) corresponding to the character information "A" or "F" of the first color is stored into each address in the RAM 102a in correspondence to the print position. Similarly, the character information "BCDE . . . " of the second color is stored into the RAM 102b.

Various kinds of timing signals which are used in the memory R/W circuit 101 will now be described.

When a read/write signal 18 for the RAMs 102a and 102b is set to the "H" level, the reading operation is executed. When it is set to the "L" level, the writing operation is performed.

An output enable signal is used to permit the output of a data selector 9. When the least significant bit $A_0$ of the address bus is set to the "L" level, that is, when the address is an even number address, a data bus 14 connected to the RAM 102b is selected and the output of the output data from the RAM 102 is allowed when an output enable signal 19 is set to the "L" level. The output data of the RAMs 102a and 102b are input to the arith logic unit 6 through data buses 14 and 15 in response to the switching instruction.

The output data of the arith logic unit 6 is input to the RAMs 102a and 102b through the data buses 14 and 15, respectively. A latch signal 33 is an instruction signal to latch the output data 14 of the RAM 102a into the register 22. A register 22 latches the data 14 by the latch signal 33. An output 29 of the register 22 is input as dot information of the first color to a data selector 24.

Reference numeral 26 denotes a write signal to the buffer memory 106 of the fast-in fast-out (FIFO) type. An output 30 of the buffer memory 106 is input as dot information of the second color to the data selector 24 in response to a read signal 28 of the buffer memory 106. Reference numeral 27 denotes a selection signal to select either one of the output data 29 of the register 22 and the output data 30 of the buffer memory 106 which are input to the data selector 24. The selected data is input as an output 31 to a video signal converter 25.

The video signal converter 25 outputs the input data 31 of the parallel digital signals as a video signal 32 to drive serial print heads. The converter 25 also controls the number of lines in one page of the video signal and counts the number of lines and controls the selection signal 27 and buffer memory read signal 28. Reference numeral 21 denotes a transfer signal when the data 14–2 is transferred to the register 22 and when the data 14–1 is transferred to the buffer memory 106.

Figure 3:
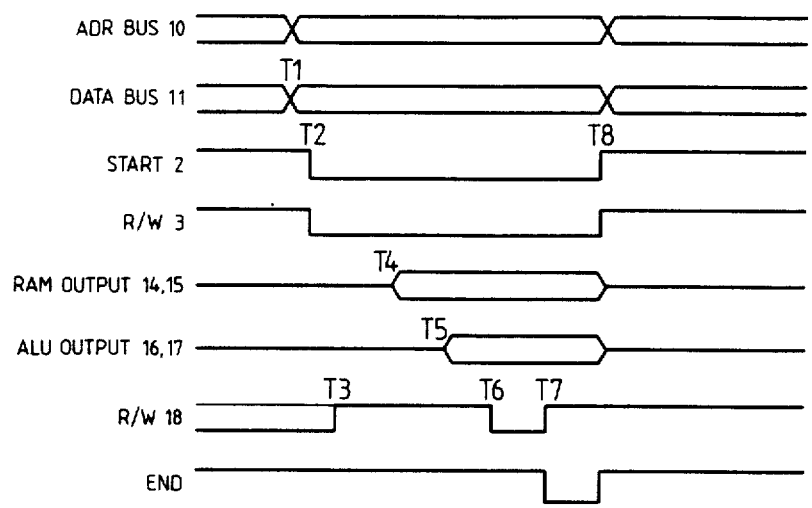
FIGS. 3 to 5 are timing charts showing operation timings of the embodiment of the invention.

FIG. 3 shows operation timings when bit images are developed into the RAMs 102a and 102b in the embodiment.

In FIG. 3, the CPU 100 sets instructions (in the embodiment, color mixture preventing instruction) for the arith logic unit 6 into the command registers 7 and 8 before developing the bit images. For instance, an instruction such that the AND of the inverted level of the input at an A terminal of the arith logic unit 6 and the input level at a B terminal is calculated and the result of the calculation is output to a C terminal is set into the command register 7. On the other hand, an instruction such that the OR of the input level at the A terminal and the input level at a D terminal is calculated and the result of the calculation is output to an E terminal is set into the command register 8.

The CPU 100 outputs addresses onto the address bus 10 and outputs the bit data onto a data bus 11 (timing $T_1$). Simultaneously, the CPU 100 sets the R/W signal 3 to the write instruction, that is, to the "L" level, thereby setting the start signal 2 to be true (the "L" level) (timing $T_2$).

Thus, the timing controller 1 sets the memory R/W signal 18 to the "H" level to thereby start the data reading operation for the arithmetic operating processes for the RAMs 102a and 102b (timing $T_3$).

The output data 14 and 15 of the RAMs 102a and 102b are specified (timing $T_4$) after the elapse of the read access time of the memories. Then, the arith logic unit 6 executes instructions in accordance with preset contents of the command registers and outputs data 16 and 17 (timing $T_5$).

The timing controller 1 sets the memory R/W signal 18 to the writing mode, that is, the "L" level and writes the results 16 and 17 of the calculations into the RAMs 102a and 102b (timing $T_6$).

Thereafter, the timing controller 1 sets the memory R/W signal 18 to the "H" level and completes the writing operation. The timing controller 1 also sets an access end signal 20 to be true (the "L" level) to thereby inform the end of writing operation to the CPU 100.

Figure 4:
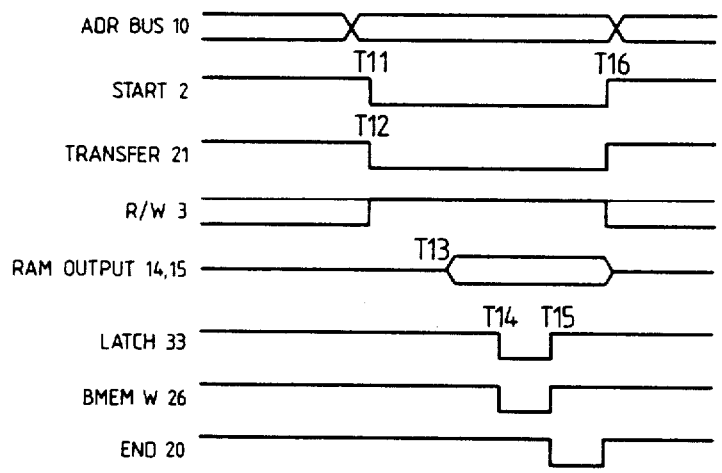

FIG. 4 shows the operation timings for reading out dot information to print from the RAMs 102a and 102b in the embodiment.

In FIG. 4, upon reception of the horizontal sync signal (not shown) from the data output unit 105, the CPU 100 outputs a read address onto the address bus 10 (timing $T_{11}$). At the same time, the CPU 100 sets the R/W signal 3 to the reading mode, that is, to the "H" level, sets the start signal 2 to be true (the "L" level), sets the transfer signal 21 to be true (the "L" level), and starts the reading operations for the RAMs 102a and 102b (timing $T_{12}$).

After the elapse of the read access time of the memories, the output data 14 and 15 of the RAMs 102a and 102b are specified (timing $T_{13}$). Then, the timing controller 1 sets the latch signal 33 and a buffer memory write signal to be true (the "L" level), thereby allowing the data 14 and 15 to be stored into the buffer memory 106 and register 22, respectively (timing $T_{14}$).

After that, the timing controller 1 sets the latch signal 33 and buffer memory write signal to the "H" level to thereby complete the storage of the output data 14 and 15. The timing controller 1 then sets the access end signal 20 to be true and informs the end of reading operation of the dot information to the CPU 100.

Figure 5:
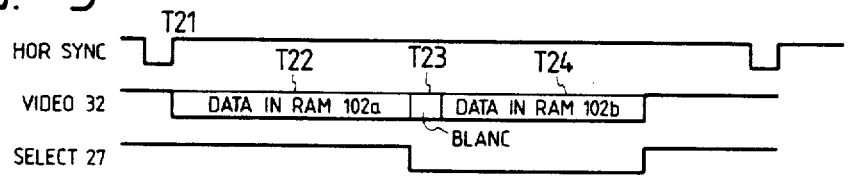

FIG. 5 shows the operation timings for transmitting the video signals of one horizontal line according to the embodiment.

In FIG. 5, the dot information of the first color, in this case, the data of the RAM 102a is input to the video signal converter 25 through the register 22 and selector 24 in response to the horizontal sync signal and is converted into the video signal and output (timings $T_{21}$ to $T_{22}$).

At this time, since the print timing to output the video signal of the second color does not come yet, the selection signal 27 of the selector 24 is held at the "H" level, the register 22 side is selected, the video signal of the second color is not sent, and a blank signal is transmitted from the selector 24 (timing $T_{23}$).

Thereafter, when the print timing at which the video signal of the second color can be output has come, the video signal converter 25 sets the selection signal 27 to the "L" level and the buffer memory 106 in which the data of the second color is stored is selected and the video signal of the second color is output (timing $T_{24}$).

As mentioned above, with respect to the reading operations from the RAMs 102a and 102b in the embodiment, the CPU 100 can read out the dot information of the second color in response to an instruction from the data output unit 105 by merely instructing the address of the dot information of the first color and instructing the reading operation. Therefore, the number of arithmetic operating processing steps of the CPU 100 can be reduced and the load of the CPU 100 is decreased. For the data output unit 105 side, since the dot information of the second color can be read out by the instruction from the data output unit 105 side, the dot information of the second color can be read out in accordance with the attaching accuracy of the print heads (laser light emitting devices).

On the other hand, since both of the dot information can be simultaneously read out from the RAMs 102a and 102b, on the CPU 100 side, a width of the write timings of the dot information for the RAMs 102a and 102b is widened and the access timings for the RAMs 102a and 102b can be easily adjusted.

Although the embodiment has been described with respect to the case where each of the data buses 10, 14, and 18 is constructed by eight bits, it can be set to 16 or 32 bits. Although the embodiment has been described by using the FIFO memory as the buffer memory 106, it can be also constructed by two buffer memories which are ordinarily used and the RAMs 102a and 102b can be separated from the data output unit side.

Further, in the embodiment, although one video signal is time sharingly output as signals of two colors to the print heads, it is also possible to output two video signals to the print heads of respective colors.

As described above, according to the invention, when the data is read out of the memories in which the data was developed into dot patterns and is converted into the video signals, both data are simultaneously read out of the memories corresponding to two colors. The data of the first color is converted into the video signal in a realtime manner and output. The data of the second color is stored into the buffer memory as timing adjusting means. Consequently, there is an advantage such that the number of access times for the memories by the CPU as reading means can be reduced into the half.

On the other hand, even in the control of the print timing for the second color, since the data of the second color is stored in the buffer memory, it can be read out by an instruction from the printer side and there is an advantage such that the read timing for the print data can be easily controlled.

Figure 7:
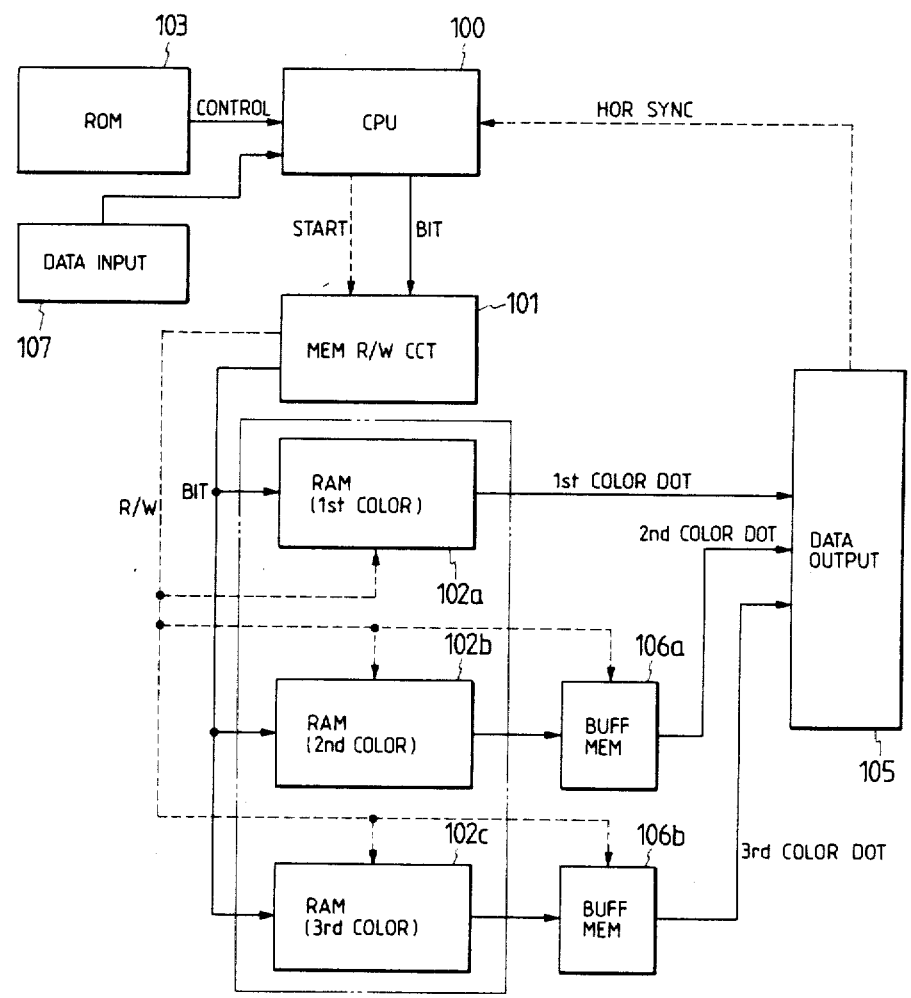
FIG. 7 is a block diagram showing another embodiment of the invention.

Although the above embodiment has been described with respect to the two-color printer, the invention can be also applied to a printer which can output by a plurality of colors such as three colors, four colors, . . . , or the like. FIG. 7 shows an explanatory diagram of another embodiment.

As shown in FIG. 7, there are provided RAMs 102a, 102b, and 102c corresponding to respective colors and having the same address arrangement. The dot signals of the second and third colors are read out of the RAMs 102b and 102c and temporarily stored into buffer memories 106a and 106b and, thereafter, they are transferred to the data output unit at the print timings.

In both FIGS. 1 and 7, the RAMs may be separated provided or a plurality of areas in one memory may be also used. On the other hand, the buffer memories may be also separately provided or a plurality of areas in one memory may be also used.

FIG. 8 shows the contents of the RAMs 102a to 102c and the print information.

What is claimed is:

1. An output apparatus comprising:
    conversion means for converting input code data into data representing a dot image of a plurality of colors;
    first memory means for storing print information of a first color among the data converted by said conversion means;
    second memory means which stores print information of a second color among the data converted by said conversion means and has the same address arrangement as that of said first memory means;
    reading means for simultaneously reading out the print information of the first and second colors from said first and second memory means synchronously with a print timing for the print information of the first color; and
    timing adjusting means for delaying a print timing for the readout print information of the second color with respect to that print timing for the print information of the first color by a predetermined time.

2. An output apparatus according to claim 1, wherein said first and second memory means are different areas in same memory means.

3. An output apparatus comprising:
    conversion means for converting input code data into bit data representing a dot image of a plurality of colors;
    first memory means having a plurality of areas for storing the bit data converted by said conversion means in accordance with a plurality of colors to be output;
    second memory means having a plurality of areas less in number than the plurality of areas in said first memory means and storing the bit data converted by said conversion means; and
    timing control means for controlling said first and second memory means such that the bit data stored in said first memory means are simultaneously read and bit data stored in said second memory means are sequentially read.

4. An output apparatus according to claim 3, wherein said plurality of areas are a plurality of individual memory means.

* * * * *